United States Patent [19]

Tanigami et al.

[11] Patent Number: 5,432,005
[45] Date of Patent: Jul. 11, 1995

[54] CHIPPING-RESISTANT COMPOSITION

[75] Inventors: Hajime Tanigami, Osaka; Hiroshi Mashima, Chiba, both of Japan

[73] Assignee: Nippon Paint Co., Ltd., Osaka, Japan

[21] Appl. No.: 71,103

[22] Filed: Jun. 4, 1993

[30] Foreign Application Priority Data

Jun. 24, 1992 [JP] Japan ................. 4-190044

[51] Int. Cl.⁶ ............................................ B32B 27/38
[52] U.S. Cl. ................. 428/414; 204/181.7; 428/516; 428/520; 523/409; 524/507; 524/510; 515/131
[58] Field of Search ............ 204/181.7; 525/131; 524/507, 510; 523/409; 428/414, 516, 520

[56] References Cited

U.S. PATENT DOCUMENTS

| | | | |
|---|---|---|---|
| 3,900,126 | 8/1975 | Ishikawa et al. | 220/75 |
| 4,983,454 | 1/1991 | Hiraki et al. | 428/325 |
| 5,098,947 | 3/1992 | Metzger et al. | 525/123 |
| 5,104,928 | 4/1992 | Craun et al. | 524/773 |

FOREIGN PATENT DOCUMENTS

| | | |
|---|---|---|
| 0466136 | 1/1992 | European Pat. Off. |
| 61-242668 | 10/1968 | Japan |
| 58-49583 | 11/1983 | Japan |
| 4-122474 | 4/1992 | Japan |
| 1408802 | 10/1975 | United Kingdom |
| 2249497 | 5/1992 | United Kingdom |

*Primary Examiner*—Melvyn I. Marquis
*Assistant Examiner*—D. Aylward
*Attorney, Agent, or Firm*—Foley & Lardner

[57] ABSTRACT

A method for forming a chipping-resistant film, a chipping resistant composition and coated articles containing the chipping-resistant film are disclosed. The method includes applying a water-based chipping-resistant composition in either (1) a coating process including electrodeposition, intermediate coating, and topcoating to form (a) a film disposed between an electrodeposited film and an intermediate-coated film, or (b) a film disposed between an intermediate-coated film and a topcoated film; or (2) a coating process including electrodeposition coating and topcoating to form (c) a film disposed between an electrodeposited film and a topcoated film. The water-based, chipping-resistant composition includes: (A) a modified ethylenical polymer which is obtained from an ethylene monomer and an ethylenically unsaturated monomer containing a carboxyl group and which has been made water-dispersible by the addition of a base, and in which at least the backbone of the ethylenical polymer molecule has carboxyl groups bonded thereto and derived from the ethylenically unsaturated monomer, the total amount of the carboxyl groups being not less than 10% by weight based on the amount of the ethylenical polymer; and (B) a water-based polyurethane resin, where the proportion of component (A) to component (B) is from 10/90 to 50/50 by weight.

21 Claims, No Drawings

CHIPPING-RESISTANT COMPOSITION

FIELD OF THE INVENTION

The present invention relates to a water-dispersible, chipping-resistant composition which gives a chipping-resistant film, and to a method for forming a chipping-resistant film using the composition. More particularly, this invention relates to a water-dispersible, chipping-resistant composition for use in the coating of outside plates of automotive body which is capable of preventing film damages due to small stones sprung by motor traffic and of preventing the steel substrate from rusting due to such film damages, and to a method for forming a chipping-resistant film.

BACKGROUND OF THE INVENTION

When an automobile is running at a high speed, collisions of small stones or the like against plates (strictly speaking, film surfaces) of the automobile are unavoidable. There are cases where such collisions of small stones sprung by motor traffic against films form cracks on the films or peel off the film from the substrates such as outside plates or other parts (so-called chipping is generated). If the chipping is generated on the film, water, etc., is permeated through the resulting flaw to form rust on the surface of the steel substrate.

In particular, in such regions as the northern part of the U.S., Canada, and northern Europe, where rock salt and sand are scattered in large quantities on roads for the purpose of melting snow in the winter season, it is particularly important for the films on steel substrates of automotive body to have chipping resistance. Thus, it is desired to obtain a film which, even when small stones collide against it, does not suffer damages (chipping) and protects the steel substrate against rusting.

The coating of steel substrater of automotive body is generally conducted by a method in which a steel plate that has been chemical-treated with iron or zinc phosphate is formed successively with an electrodeposition coatings (i.e., primer), an intermediate-coating paint, and a topcoating paint. In order to improve chipping resistance and rust-preventive properties, various improvements have so far been proposed on electrodeposition coatings (i.e., primer), intermediate-coating paints (i.e., intermediate coatings), and topcoating paint and on coating methods therefor.

For example, U.S. Pat. No. 3,900,126 (corresponding to JP-B-58-49583; the term "JP-B" as used herein means an "examined Japanese patent publication") discloses a metallic can having a glued layer on the seam portion, which is characterized in that the glued layer comprises an olefin copolymer having a carboxyl group in the side chain and a polyurethane resin in a proportion of 5:100 to 100:5 by weight, the olefin copolymer being the copolymer of an aliphatic $\alpha$-olefin having not more than 10 carbon atoms with an $\alpha,\beta$-ethylenically unsaturated carboxylic acid having 3 to 8 carbon atoms, which has a melt index of 30 to 300 dg/min, and the polyurethane resin being the reaction product of an isocyanate with either a polyether or a polyester.

JP-A-61-242668 discloses a coating method which comprises applying electrodeposition coatings on a steel, subsequently applying thereon a water-based barrier coating (paint) which forms a film having a static glass transition temperature of 0° to −75° C., and then applying thereon an intermediate-coating (paint) and a topcoating (paint). Preferred examples of the resin for the water-soluble or water-dispersible barrier-coating (paint) to be used in this method include a modified polyolefin resin, styrene-butadiene copolymer, butadiene resin, and acrylic resin. The specific examples of the modified polyolefin resin which are given in the reference include a mixture obtained by blending a propylene-ethylene copolymer with a chlorinated polyolefin and a graft polymer obtained by graft-polymerizing maleic acid or anhydride with a propylene-ethylene copolymer.

Further, GB 2,249,497 (corresponding to JP-A-4-122474) discloses a method for coating an outside plate of automotive body comprising a metallic member and a plastic member. In this method, a metallic member coated with cationic electrodeposition coatings and a plastic member are assembled beforehand into an automotive body part, and this body part is coated with a water-soluble or water-dispersible barrier-coating paint containing as the major vehicle component a composition comprising an olefin resin and a urethane resin. The resulting body part may be coated with an intermediate-coating paint, if necessary, and is then coated with a topcoating paint.

The examples of the olefin resin for use in the above water-soluble or water-dispersible barrier-coating paint which are given in GB 2,249,497 (corresponding to JP-A-4-122474) include a propylene-ethylene copolymer, chlorinated polypropylene, EPDM (ethylene-propylene-diene copolymer), polybutadiene, styrene-butadiene copolymer, acrylonitrile-butadiene copolymer, and acid radical-containing polymers obtained by polymerizing these polymers with an acid radical-containing, polymerizable unsaturated monomer such as maleic acid, maleic anhydride, acrylic acid, or methacrylic acid. In this reference, there are descriptions to the effects that an acid radical-containing polymer obtained by polymerizing maleic acid (anhydride) with a chlorinated polypropylene is especially preferred, and that in the case of using maleic acid, the amount of maleic acid (anhydride) incorporated in the acid radical-containing polymer is from 0.5 to 10% by weight based on the amount of the polymer.

However, the methods described above are still unsatisfactory in sufficient chipping resistance. It has been ascertained from investigations made by the present inventors that even when a water-based chipping primer is prepared by dissolving or dispersing a conventional chipping-resistant primer of the solvent-based type by changing the polymerization method for the conventional primer or using a surfactant or emulsifying agent, the chipping-resistant film obtained from this water-soluble or water-dispersible chipping primer cannot sufficiently absorb the impact energy of collisions of small stones or the like against the film and, hence, sufficient chipping resistance cannot be obtained.

SUMMARY OF THE INVENTION

Accordingly, an object of the present invention is to provide a water-dispersible, chipping-resistant composition which gives a film having good chipping resistance.

Another object of the present invention is to provide a coating method for forming a film having good chipping resistance.

A further object of the present invention is to provide a coated article having a multi-layered film formed by coating an automotive body with a method for forming a chipping resistant film which comprises applying a water-dispersible, chipping-resistant composition.

In view of the above-described objects, the present inventor made intensive studies and, as a result, it has been found that a composition obtained by blending, in a specific proportion, (a) an ethylenical polymer which is a water-soluble or water-dispersible polymer comprising mainly ethylene monomer and a carboxyl group-containing ethylenically unsaturated monomer and which contains a specific amount of carboxyl groups, part of the carboxyl groups being bonded to the backbone of the polymer molecule, and (b) a water-soluble or water-dispersible polyurethane resin gives a film which exhibits both of the excellent adhesion possessed by the ethylene polymer and the softness of the polyurethane resin. The present invention has been completed based on this finding.

In the present invention, the term "water-soluble, water-dispersible" means that the resin is soluble in water or has good dispersibility into water (hereinafter, referred to as "water-based").

The present invention provides a water-based, chipping-resistant composition comprising, as major components, (A) a modified ethylenical polymer which is obtained from an ethylene monomer and an ethylenically unsaturated monomer containing a carboxyl group and which has been made water-dispersible by the addition of a base, and in which at least the backbone of the ethylenical polymer molecule has carboxyl groups bonded thereto and derived from the ethylenically unsaturated monomer, the total amount of the carboxyl groups being not less than 10% by weight based on the amount of the ethylenical polymer, and (B) a water-based polyurethane resin, the proportion of component (A) to component (B), i.e., (A)/(B) ratio, being from 10/90 to 50/50 by weight.

The present invention further provides a method for forming a chipping-resistant multilayered film which comprises applying the above-described, water-based, chipping-resistant composition in either (1) a coating process comprising electrodeposition, intermediate coating, and topcoating to form
  (a) a film disposed between an electrodeposited film and an intermediate-coated film, or
  (b) a film disposed between an intermediate-coated film and a topcoated film, or
(2) a coating process comprising electrodeposition and topcoating to form
  (c) a film disposed between an electrodeposited film and a topcoated film.

The present invention furthermore provides a coated article having a multi-layered film formed by coating the film on an automotive body with the above-described, chipping-resistant film-forming method using the water-based composition described above.

DETAILED DESCRIPTION OF THE INVENTION

The water dispersible, chipping-resistant composition of the present invention comprises, as major components, (A) a water-based, modified ethylenical polymer comprising mainly of a polyethylene resin modified with a carboxyl group-containing ethylenically unsaturated monomer and (B) a water-based polyurethane resin.

In the modified ethylenical polymer of component (A), at least part of the carboxyl groups contained therein are bonded to the backbone (i.e., the main chain) of the polymer molecule.

The modified ethylenical polymer having such a structure can be produced from an ethylene monomer and an ethylenically unsaturated monomer containing a carboxyl group through a high-pressure polymerization reaction. This high-pressure polymerization reaction may be carried out, for example, by a method in which an ethylene monomer and an ethylenically unsaturated monomer having a carboxyl group are continuously introduced into a reaction vessel which is kept at a pressure of 1,500 to 2,000 atm and a temperature of 150° to 250° C., in a proportion of about from to 100/2 to react in the presence of a peroxide. As a result, a modified ethylenical polymer is obtained which has a structure in which carboxyl groups are bonded directly to carbon atoms in the backbone of the ethylenical polymer molecule. In this case, not all of the carboxyl groups are bonded to carbon atoms in the backbone of the polymer molecule, but part of the carboxyl groups are bonded to carbon atoms in side chains.

As described above, it is necessary that in the modified ethylenical polymer of the present invention, at least part of the carboxyl groups be bonded directly to the backbone (i.e., the main chain) of the molecule. Use of the modified ethylenical polymer having such a structure makes it possible to form a film having sufficient flexibility and high resistance to tearing forces (i.e., a chipping-resistant film). Although the reasons why such an effect is obtained have not been fully elucidated, it may be presumed that carboxyl groups bonded to the backbone of an ethylenical polymer molecule form the hydrogen bonds with carboxyl groups each other bonded to the backbone of an adjacent ethylenical polymer molecule to establish a network structure having a moderate strength, and this brings about the effect described above. The carboxyl groups bonded to side chains may contribute to such effect in some degree, but use of a copolymer in which carboxyl groups are bonded to side chains only results in a film having decreased toughness. This may be because the pseudo-crystallization (apparent crystallization) caused by the hydrogen bonds of such carboxyl groups functions predominantly.

Examples of the ethylenically unsaturated monomer containing a carboxyl group include so-called α- or β-ethylenically-unsaturated carboxylic acids. Specific examples thereof include acrylic acid, methacrylic acid, and maleic acid anhydride. Of these, acrylic acid is especially preferably used.

In synthesizing a modified ethylenical polymer for use as component (A), one or more polymerizable monomers such as an acrylic acid ester, a methacrylic acid ester, styrene, vinyl chloride, vinyl acetate, acrylonitrile, methacrylonitrile, and the like may be used, if desired, besides the above-described two monomers (ethylene and a carboxyl group-containing ethylenically unsaturated monomer, e.g., acrylic acid).

The total amount of carboxyl groups contained in component (A) should be 10% by weight or more based on the amount of component (A) (i.e., the amount of the modified ethylenical polymer). If the amount of the carboxyl group is below the lower limit, the chipping-resistant film obtained has low tensile strength. The amount of the carboxyl group is preferably from 12.5 to 30% by weight and particularly preferably from 15 to 25% by weight.

Component (A) should be a water-based polymer.

Although the ethylenical polymer in which carboxyl groups are bonded to the backbone (i.e., the main chain) of the polymer molecule can be used in the form of a solution, dispersion, or powder, it is preferred to use it as an aqueous dispersion to prepare the composition of the present invention.

The aqueous dispersion of component (A) (ethylenical polymer) can be prepared by adding water and a base (e.g., ammonia, morpholine, an alkanolamine, caustic soda, or caustic potash) to the polymer, the base being added in an amount sufficient to form an oil in water type emulsion, and then heating the mixture to 90° to 200° C. with stirring. Illustratively stated, water is added in an amount of 5 to 25% by weight based on the amount of the modified ethylenical polymer and a base is added in an amount of about 2 to 3 equivalent times the carboxyl group-containing ethylenically unsaturated monomer, and the resulting mixture is sufficiently stirred, which preferably is conducted in an autoclave at 90° to 100° C. for 1 to 2 hours, to prepare a water in oil type emulsion consisting of the modified ethylenical polymer, water, and base. Subsequently, water is added thereto with stirring to obtain the oil in water type emulsion containing the modified ethylenical polymer in an amount of 50% by weight or less.

As the water-based polyurethane resin (B), a polyurethane resin obtained by reacting an isocyanate compound with a polyether or polyester can be used.

Examples of the isocyanate compound include tolylene diisocyanate, 4,4'-diphenylmethane diisocyanate, tolidine diisocyanate, hexamethylene diisocyanate, m-xylene diisocyanate, and derivatives thereof.

The polyether that can be used for producing component (B) to be employed in the present invention is one having at least two active hydrogens. Representative examples thereof include poly(oxypropylene) glycols, an adduct of poly(oxypropylene) with glycerine, an adduct of poly(oxypropylene) with trimethylolpropane, an adduct of poly(oxypropylene) with 1,2,6-hexanetriol, an adduct of poly(oxypropylene) with pentaerythritol, an adduct of poly(oxypropylene) with sorbitol, polytetrafuran polyethers which have been chain-lengthened with methylenebis(phenyl-diisocyanate) or hydrazine, and derivatives thereof.

As the polyester also, one having at least two active hydrogens is used. Representative examples thereof include products of the reaction of adipic acid or phthalic acid anhydride with ethylene glycol, propylene glycol, 1,3-butylene glycol, 1,4-butylene glycol, diethylene glycol, 1,2,6-hexanetriol, trimethylolpropane, or 1,1,1-trimethylolethane.

The polyurethane resin also is a water-based resin. Although this polyurethane resin can be used in the form of a solution, dispersion, or powder, it is preferred in this invention to use it as an aqueous dispersion.

In the case of using the polyurethane resin in the form of an aqueous dispersion, it is preferred that the aqueous dispersion have a resin concentration of 10 to 80% by weight, particularly 20 to 60% by weight. This aqueous dispersion can be obtained by a method in which a product of the reaction of a polyether or polyester described above with an excess of an isocyanate compound is dispersed in water with the aid of a cationic, nonionic, or anionic surfactant and the dispersed polyurethane resin is chain-lengthened with a primary diamine (e.g., ethylenediamine or m-tolylenediamine), 1,2-bis(2-cyanoethylamino)ethane, or the like.

If a polyether having three or more hydroxyl groups per molecule is selected from the polyethers described above, the desired urethane resin dispersion can also be prepared by adding an excess of an isocyanate compound to the polyether to react, subsequently inactivating the residual NCO groups with phenol or the like to produce a blocked isocyanate compound, and then dispersing the compound into water in the presence of, e.g., a nonionic surfactant.

The proportion of the modified ethylenical polymer of component (A) to the water-based polyurethane resin of component (B) to be blended (proportion with respect to the amount of resin only, excluding dispersion medium) is from 10/90 to 50/50 by weight. If the proportion of (A) to (B) is below 10/90 (the amount of component (A) is too small), the film obtained has decreased cohesion (tensile strength) and shows poor chipping resistance. On the other hand, if it exceeds 50/50, the film has too high cohesion, so that it has poor appearance or poor film performance due to the too high film brittleness. The preferred range of the proportion of (A) to (B) is from 15/85 to 40/60, with the especially preferred range thereof being from 20/80 to 35/65.

It is preferable, as described above, that components (A) and (B) each be dispersed into water and the aqueous dispersions be then mixed. In this case, the resin concentration of the aqueous dispersion obtained by mixing the dispersion of component (A) with that of component (B) is preferably from 10 to 60% by weight, more preferably from 20 to 50% by weight.

The chipping-resistant composition thus obtained may be used as it is. However, it is possible to further add thereto one or more other resin components (C) selected from epoxy resins (e.g., bisphenol A epoxy resins, bisphenol F epoxy resins, tetrahydroxyphenylmethane epoxy resins, novolak epoxy resins, polyalcohol polyglycol epoxy resins, glycerine triether epoxy resins, and olefin epoxy resins), phenolic resins (e.g., resole phenolic resins and novolak phenolic resins), melamine resins (e.g., trimethylolmelamine resins and melamine-formaldehyde resins), polyester resins (e.g., alkyd resins obtained by the co-condensation of a polyhydric alcohol with a dibasic acid, poly(ethylene terephthalate) resins, and poly(ethylene isophthalate) resins), and copolymer resins obtained by copolymerizing an α,β-ethylenically-unsaturated carboxylic acid and a polymerizable monomer, i.e., acrylic resins (e.g., vinyl acetate-acrylic acid copolymer resins and styrene-maleic acid anhydride copolymer resins). Such resin (C) may be added preferably in an amount of 1 to 20% by weight (particularly 3 to 10% by weight), based on the total amount of the composition of the present invention.

If necessary, pigments and various additives for use in the field of ordinary coating compositions may be added in such an amount that the objects of the present invention can be attained.

Usable examples of the pigments include inorganic pigments such as carbon black, titanium dioxide, and iron oxide, organic pigments, and extender pigments such as barium sulfate and talc.

It is also possible to add a surface modifier such as a polysiloxane, for the purpose of preventing cissing or cratering.

The above-described various additives may be added in the amounts shown below. The amounts of a pigment and a surface modifier are from 1 to 30 parts by weight and from 1 to 5 parts by weight, respectively, per 100 parts by weight of the total of the above-described essential components (A) and (B) (in terms of solid amount). In the case of using other additives, they are incorporated in an amount up to 10 parts by weight in total.

Therefore, the representative example of mixing ratio for the chipping-resistant composition containing the additives described above is shown below.

| | |
|---|---|
| Component (A) | 10 to 50% by weight |
| Component (B) | 90 to 50% by weight |
| Component (C)* (other resins) | 0 to 20% by weight |
| Pigments | 0 to 30% by weight |
| Additives | 0 to 5% by weight |
| Total (solid base) | 100% by weight (100 parts by weight) |
| Thinner, water or organic solvent | 200 to 2000 parts by weight |

The water-based, chipping-resistant composition of the present invention may be applied in either (1) a coating process comprising electrodeposition, intermediate coating, and topcoating to form (a) a film disposed between an electrodeposited film and an intermediate-coated film, or (b) a film disposed between an intermediate-coated film and a topcoated film, or (2) a coating process comprising electrodeposition and topcoating to form (c) a film disposed between an electrodeposited film and a topcoated film.

In the case of item (1)-(a) described above, a paint obtained by the chipping-resistant composition of the present invention is coated, and an intermediate-coating paint may be then coated thereon by the so-called wet-on-wet coating method or by means of a combination of preheating and subsequent wet-on-wet coating. In the case of item (1)-(b) described above, a paint obtained by the chipping-resistant composition of the present invention is coated on an intermediate-coated film, and top-coating paint may be then coated thereon by the wet-on-wet coating method or by means of a combination of preheating and subsequent wet-on-wet coating. On the other hand, in the case of item (2)-(c) described above, a paint obtained by the chipping-resistant composition of the present invention is coated on an electrodeposited film, and topcoating paint may be then coated thereon by the wet-on-wet coating method or by means of a combination of preheating and subsequent wet-on-wet coating. The preheating is a technique of heating the coating at 40° to 80° C. for 5 to 60 minutes, e.g., at 80° C. for 5 minutes. The heating may be conducted by hot-air heating, infrared irradiation, etc. In each of item (a), (b), and (c) described above, it is preferred to use a combination of preheating and subsequent wet-on-wet coating.

As the electrodeposition coatings, any of the conventional anionic resin type and cationic resin type can be used.

Resins for use as the major components of electrodeposition coatings include the following, which have been classified by structure: (1) those having the backbone of a drying oil or a liquid rubber such as polybutadiene or, in some cases, the backbone of a resin obtained by epoxidizing such an oil or rubber (e.g., maleic oil resins, maleic acid-modified polybutadiene resins, and amine-epoxidized polybutadiene resins); (2) those having the backbone of a fatty acid ester of a resinous polyol and those obtained by modifying such resins (e.g., epoxy resins and esterified resins); (3) those having the backbone of an alkyd resin; and (4) those having the backbone of an acrylic resin.

In the case where the resin to be used in the electrodeposition coatings are an acid resin, it is preferred that the resin be neutralized with a base such as ammonia, amine, or inorganic alkali and then dissolved or dispersed in water. In the case of using a basic resin, it is preferred to neutralize it with an acid such as acetic acid, lactic acid, boric acid, or phosphoric acid and then dissolve or disperse the resulting resin in water.

Into the electrodeposition coatings, additives which are ordinarily used may suitably be further incorporated, such as a crosslinking agent (e.g., a melamine resin or a blocked isocyanate), a pigment, and a solvent.

It is usually preferred that the electrodeposition be conducted so as to deposit a film having a thickness of 10 to 40 $\mu$m on a dry basis (hereinafter the same). The other conditions for the electrodeposition may be the same as for conventional electrodeposition processes.

It is also preferred that the ordinary chemical conversion be conducted prior to the electrodeposition.

According to the method of the present invention, in the case where the step of intermediate coating is included in the coating process, coating with the chipping-resistant composition of the present invention is conducted either before or after the intermediate coating. In the case where the step of intermediate coating is not included, after electrodeposition, coating with the chipping-resistant composition of the present invention is conducted as described above.

As the intermediate coatings (i.e., the intermediate-coating paints), a coating paint of the alkyd resin, polyester resin, or acrylic resin type may be used. The intermediate coatings may be applied by an ordinary method, e.g., electrostatic spray coating. Baking may also be performed in an ordinary method. The thickness of the intermediate-coated film is preferably from 20 to 60 $\mu$m.

A "colored intermediate paint" containing a coloring pigment may be used as the intermediate-coating paint so as to give an attractive finish when combined with a topcoating paint.

For dissolving or dispersing the chipping-resistant composition of the present invention in water or a water-miscible hydrophilic organic solvent (e.g., an alcohol, ester, or ketone) to obtain a paint, lacquer, or coating solution which is generally called "chipping primer" or "chipping-protective primer", it is necessary to sufficiently disperse and mix the components. This can be attained by using a mixing device for use in producing ordinary paints, such as a paint shaker, dissolver, ball mill, sand grinding mill.

The chipping-resistant composition of the present invention is suitably diluted with water or a hydrophilic organic solvent to obtain a solid content of preferably 10 to 60%, and is applied by a coating machine.

As a coating machine, an atomizing type coating machine is preferably used. Examples thereof include an air spray coater, an airless spray coater, and an air-atomization or rotary electrostatic coater.

It is preferable that the chipping-resistant film obtained by the composition of the present invention has a thickness of 4 to 25 $\mu$m. If the thickness of the chipping-resistant film is below 4 $\mu$m, the film has poor chipping resistance. If the thickness thereof exceeds 25 $\mu$m, a poor appearance results because in wet-on-wet coating, an upper film and a lower film are mixed. The most preferred range of the thickness of the chipping-resistant film is from 8 to 15 μm.

Examples of the topcoating paint include paints of the acrylic/melamine resin, polyester resin, and fluororesin types. These may be any of the organic solvent-based type, water-based type, and powder type paint.

After an ordinary color paint (solid color or metallic color) has been applied as a topcoating paint, a clear finishing paint may be applied thereon for protecting the topcoated color film against weathering and other outdoor environment.

The present invention will be explained below in more detail with reference to the following examples, but the invention is not construed as being limited thereto.

EXAMPLES 1 AND 3 AND COMPARATIVE EXAMPLES 1 TO 7

A cationic electrodeposition coatings ("Power Top U-233E", manufactured by Nippon Paint Co., Ltd.) was applied on a dull steel plate which had dimensions of 7 cm ×15 cm×0.8 mm and was subjected to zinc phosphate treatment, to obtain a conversion coating having a thickness of about 20 μm. The electrodeposited film was then baked under the conditions of 165° C. and 30 minutes.

Subsequently, an ethylene-acrylic acid copolymer having a nonvolatile content of 30% and an acrylic acid content of 20%, as component (A), was mixed with a soft urethane emulsion ("Bondic 1310NSC", manufactured by Dai-nippon Ink & Chemicals, Inc., Japan; nonvolatile content, 50%), as component (B), in a mixing ratio shown in Table 1 to prepare the compositions.

Each of the thus-obtained chipping-resistant compositions was applied on the electrodeposition film by spray coating to obtain the film having a thickness of about 10 μm.

After the above wet film, preheated at 80° C. for 5 minutes, and an intermediate-coating paint ("Orga P-61-1 Gray", manufactured by Nippon Paint Co., Ltd.; polyester/melamine resin coating paint) was then applied by air spray coating to obtain the film having a thickness of about 35 μm, set a wet film for 7 minutes, and was baked at 140° C. for 25 minutes.

Thereafter, an acrylic resin-type first topcoating paint ("Superlac M-80 Metallic Color Base", manufactured by Nippon Paint Co., Ltd.) was applied at a thickness of about 15 μm, and the resulting coating was allowed to set for 3 minutes. A clear color coating paint (i.e., a clear color paint) as a second topcoating paint ("Superlac O-130", manufactured by Nippon Paint Co., Ltd.) was then applied with an electrostatic coater to obtain the film having a thickness of about 30 μm, and the resulting coating was allowed to set for about 7 minutes. Baking was then conducted at 140° C. for 25 minutes to obtain test pieces (Examples 1 to 4).

Further, test pieces(Comparative Example 1) were prepared in the same manner as in Example 1 except that chipping-resistant composition (chipping primers) obtained by changing the proportion of component (A) to component (B) as shown in Table 1 were used.

Furthermore, test pieces were prepared in the same manner as in Example 1 except that each of the following chipping-resistant composition was used (provided that no chipping-resistant composition was used in Comparative Example 6).

Chipping-Resistant Composition

Comparative Example 2: Paint consisted only of the component (A) in the chipping-resistant composition of Example 1.

Comparative Examples 3 and 4: Paint consisted of a urethane emulsion only.

Comparative Example 5: Paint consisted only of a polycarbonate emulsion.

Comparative Example 6: No chipping-resistant composition was used.

Comparative Example 7: Conventional chipping primer (modified olefin resin type paint) was used.

Comparative Example 8: Acrylic resin emulsion of the same kind as employed in the barrier coat of JP-A-61-242668 was used.

Comparative Example 9: The same olefin/urethane resin emulsion as employed in the barrier coat of JP-A-1-122474 was used.

TABLE 1

| Example No. | Resin component of chipping-resistant composition | EAA/U Em Ratio[1] |
|---|---|---|
| Ex. 1 | EAA[2] and U Em 1[3] | 25/75 |
| Ex. 2 | EAA[2] and U Em 1[3] | 15/85 |
| Ex. 3 | EAA[2] and U Em 1[3] | 40/60 |
| Ex. 4 | EAA[2] and U Em 1[3] | 50/50 |
| Comp. Ex. 1 | EAA[2] and U Em 1[3] | 5/95 |
| Comp. Ex. 2 | EAA[2] only | 100/0 |
| Comp. Ex. 3 | U Em 1[3] only | 0/100 |
| Comp. Ex. 4 | U Em 2[4] only | — |
| Comp. Ex. 5 | PC Em[5] only | — |
| Comp. Ex. 6 | no chipping primer | — |
| Comp. Ex. 7 | conventional chipping primer[6] | — |
| Comp. Ex. 8 | acrylic resin[7] | — |
| Comp. Ex. 9 | olefin resin/urethane resin[8] | — |

Notes to Table 1
[1] Weight ratio of the ethylene-acrylic acid copolymer to the aqueous (i.e., water-based) urethane emulsion.
[2] Ethylene-acrylic acid copolymer having a nonvolatile component content of 30% by weight and an acrylic acid content of 20% by weight.
[3] Aqueous urethane emulsion ("Bondic 1310NSC", manufactured by Dainippon Ink & Chemicals, Inc.).
[4] Aqueous urethane emulsion ("R-960", manufactured by ICI Ltd.).
[5] Polycarbonate emulsion ("XR-9603", manufactured by ICI Ltd.).
[6] Modified olefin resin type paint.
[7] The acrylic resin is constituted by the following monomers:

| | |
|---|---|
| AA (acrylic acid) | 0.39% |
| LMA (lauryl methacrylate) | 62.07% |
| NBA (n-butyl acrylate) | 16.79% |
| 4HBA (4-hydroxybutyl acrylate) | 15.40% |
| EHA (ethylhexyl acrylate) | 5.36% | and has the following properties:
$T_g$ −60° C.
OH value = 60
Acid value = 3
$M_n$ (found) = 17,000
$M_w$ (found) = 67,000.
[8] Urethane-modified polyolefin obtained by the addition (at 70° C.) of Polytail H (manufactured by Mitsubishi Chemical Industries Ltd., Japan) to Dumiran D-190N (manufactured by Takeda Chemical Industries, Ltd., Japan) in a ratio of 35.0/22.0 (OH/NCO = 1.0/3.5) (i.e., a polymer obtained by allowing a bifunctional isocyanate to add a polyolefin polyol).

The test pieces obtained were evaluated with respect to chipping resistance and film appearance by the methods described below. The results obtained are shown in Table 2. Further, each of the chipping-resistant composition of the above Examples and Comparative Examples was applied on a polypropylene base to form a chipping-resistant film, which was evaluated with respect to properties by touching with the hand. The results obtained are shown in Table 2.

(1) Chipping Resistance

Test was conducted using a Graverro tester (manufactured by Suga Shikenki K.K., Japan) under the following conditions.

Size of stone: #7 crushed stone (according to JIS A 5001)
Amount of stone: 50 g
Distance: 35 cm
Air pressure: 4.0 kg/cm$^2$
Angle: 45°
Test temperature: −20° C.

After the chipping resistance test, the resulting samples were visually examined and the degrees of chipping resistance were evaluated in the following five grades, with the chipping resistance of the test sample having no chipping primer film (Comparative Example 6) being rated as "B".

E: Excellent (peelings were entirely observed)
G: Good (few peelings were observed)
M: Medium (peelings of 1 mm (diameter) or smaller were scatteringly observed)
P: Poor (peelings were considerably observed)
B: Bad (peeling were extremely considerably observed)

(2) Film Appearance

The test pieces that were subjected to up to topcoating were visually evaluated with respect to surface shrinkage, blurring, and blushing property in the following five grades.

E: Excellent (shrinkage, blurring, and blushing were not entirely observed)
G: Good (shrinkage, blurring, and blushing were almost observed)
M: Medium (shrinkage, blurring, and blushing were slightly observed)
P: Poor (shrinkage, blurring, and blushing were considerably observed)
B: Bad (shrinkage, inversion, blurring, and blushing were extremely considerably observed)

TABLE 2

| Example No. | Film appearance | Chipping resistance | Property of chipping-resistant film |
| --- | --- | --- | --- |
| Ex. 1 | E | E | tough |
| Ex. 2 | E | E | tough |
| Ex. 3 | E | E | tough |
| Ex. 4 | E | G | hard and strong |
| Comp. Ex. 1 | G | M | able to be elongated but not tough |
| Comp. Ex. 2 | G[1] | G | hard and strong |
| Comp. Ex. 3 | E | M | soft |
| Comp. Ex. 4 | E | P | soft |
| Comp. Ex. 5 | M[2] | P | brittle and not tough |
| Comp. Ex. 6 | E | B | — |
| Comp. Ex. 7 | E | M | soft and able to be well elongated |
| Comp. Ex. 8 | B[3] | B | brittle |
| Comp. Ex. 9 | B[2] | G | soft |

Notes to Table 2
[1]Shrinkage occurred in a large-thickness part.
[2]Shrinkage occurred.
[3]Inversion occurred.

EXAMPLES 5 AND 6 AND COMPARATIVE EXAMPLES 10 TO 15

Test pieces were prepared in the same manner as in Example 1 except that each of the following two paint sets was used as a topcoating paint; each topcoating set composed of two paints consisting of a base coating paint (for forming the lower film) and a clear color coating paint (for forming the upper film).

Topcoating paint (i):

Water-based topcoating paints of the acrylic/melamine resin type
(1) "Orga TO-H900 Metallic Color Base" (water-based type), manufactured by Nippon Paint Co., Ltd.
(2) "Orga TO-561 Clear" (organic solvent-based type), manufactured by Nippon Paint Co., Ltd.

Topcoating paint (ii):

Topcoating paints formulated for protection against acid rain
(1) "Orga TO-H500 Metallic Color Base" (organic solvent-based type), manufactured by Nippon Paint Co., Ltd.
(2) "Orga TO-H580 Clear" (organic solvent-based type), manufactured by Nippon Paint Co., Ltd.

The test pieces obtained were evaluated with respect to film appearance and chipping resistance in the same manner as in Example 1. The results obtained are shown in Table 3.

For comparison, test pieces (Comparative Examples 10 to 12) were prepared in the same manner as in Example 1 except that a modified olefin resin type paint was used in place of the chipping-resistant composition according to the present invention, and that the same topcoating paint as used in Example 1 (topcoating paint (iii) shown below), the above-described topcoating paint (i), or the above-described topcoating paint (ii) was used as a topcoating paint. The modified olefin resin type paint was applied to obtain the film a thickness of 5 μm.

Topcoating paint (iii):

Acrylic/melamine resin paints (organic solvent-based type)
(1) "Superlac M-80 Metallic Color Base", manufactured by Nippon Paint Co., Ltd.
(2) "Superlac 0-130 Clear Topcoat", manufactured by Nippon Paint Co., Ltd.

Further, test pieces (Comparative Examples 13 to 15) were applied in the coating process comprising electrodeposition, intermediate coating, and topcoating (coating with one of topcoating paints (i) to (iii)), without using the chipping-resistant composition of the present invention or conventional chipping primer.

The test pieces obtained were evaluated with respect to film appearance and chipping resistance in the same manner as in Example 1. The results obtained are shown in Table 3.

TABLE 3

| Example No. | Chipping composition | Topcoating paint[1] | Film appearance | Chipping resistance |
| --- | --- | --- | --- | --- |
| Ex. 5 | composition of the invention[2] | (i) | E | E |
| Ex. 6 | composition of the invention[2] | (ii) | E | E |
| Comp. Ex. 10 | conventional primer[3] | (iii) | E | M |
| Comp. Ex. 11 | conventional primer[3] | (i) | E | M |
| Comp. Ex. 12 | conventional primer[3] | (ii) | G | M |
| Comp. Ex. 13 | none | (iii) | G | B |
| Comp. Ex. 14 | none | (i) | G | B |

TABLE 3-continued

| Example No. | Chipping composition | Top-coating paint[1] | Film appearance | Chipping resistance |
|---|---|---|---|---|
| Comp. Ex. 15 | none | (ii) | G | B |

Notes to Table 3
[1]Topcoating paints (i) to (iii) each consists of a combination of a first topcoat and a second topcoat as described above.
[2]The primer is the same chipping-resistant composition as in Example 1.
[3]Modified olefin resin coating paint.

EXAMPLES 7 TO 10

The same dull steel plate as used in Example 1 were subjected to electrodeposition and baking and then to intermediate coating and baking in the same manner as in Example 1. On the intermediate film, a chipping-resistant film was then formed at a thickness of 10 μm with the same chipping-resistant composition as used in Example 1. After preheating was conducted at 80° C. for 5 minutes, topcoating was performed using each of the above-described topcoating paints (i) to (iii) (each consisting of a combination of a first topcoat and a second topcoat) or using topcoating paint (iv) shown below, followed by baking at 140° C. for 25 minutes.

Topcoating paint (iv):

"Orga G-75 White", manufactured by Nippon Paint Co., Ltd.

The test pieces obtained were evaluated with respect to film appearance and chipping resistance in the same manner as in Example 1. The results obtained are shown in Table 4.

TABLE 4

| Example No. | Topcoating paint | Film appearance | Chipping resistance |
|---|---|---|---|
| Ex. 7 | (i) | E | E |
| Ex. 8 | (ii) | E | E |
| Ex. 9 | (iii) | E | E |
| Ex. 10 | (iv) | E | E |

As described above in detail, the coating composition of the present invention exhibits good adhesion to the adjacent coated (film) layers, and exhibits good chipping resistance, which is different from conventional chipping primers.

Although the water-based chipping-resistant composition of the present invention may be combined with solvent-based conventional paints, it can also be advantageously combined with water-based paints. In the latter case, all the paints for use in a coating system can be water-soluble or water-dispersible.

When used in combination with a new curable paint formulated for protection against acid rain, the water-based, chipping-resistant composition of the present invention can form a film having good durability.

The water-based, chipping-resistant composition of the present invention and the method of the invention which uses the composition are suitable for the coating of outside plates of automotive body.

While the invention has been described in detail and with reference to specific embodiments thereof, it will be apparent to one skilled in the art that various changes and modifications can be made therein without departing from the spirit and scope thereof.

What is claimed is:

1. A method for forming a chipping-resistant film which comprises applying a water-based chipping-resistant composition in either
   (1) a coating process comprising electrodeposition, intermediate coating, and topcoating to form
      (a) a film disposed between an electrodeposited film and an intermediate-coated film, or
      (b) a film disposed between an intermediate-coated film and a topcoated film, or
   (2) a coating process comprising electrodeposition and topcoating to form
      (c) a film disposed between an electrodeposited film and a topcoated film,
   said water-based, chipping-resistant composition consisting essentially of, as major components
   (A) a modified ethylenical polymer which is obtained from ethylene monomer and an ethylenically unsaturated monomer containing a carboxyl group and which has been made water-dispersible by the addition of a base, and in which at least the backbone of the ethylenical polymer molecule has carboxyl groups bonded thereto and derived from the ethylenically unsaturated monomer, the total amount of the carboxyl groups being from 12.5 to 30% by weight based on the amount of the ethylenical polymer, and
   (B) a water-based polyurethane resin,
   the proportion of component (A) to component (B) being from 10/90 to 50/50 by weight, and wherein said chipping-resistant film has a dry thickness of 4 to 25 μm.

2. A coated article having a multi-layered film formed by coating on an automotive body with a method for forming a chipping-resistant film which comprises applying a water-based, chipping-resistant composition in either
   (1) a coating process comprising electrodeposition, intermediate coating, and topcoating to form
      (a) a film disposed between an electrodeposited film and an intermediate-coated film, or
      (b) a film disposed between an intermediate-coated film and a topcoated film, or
   (2) a coating process comprising electrodeposition and topcoating to form
      (c) a film disposed between an electrodeposited film and a topcoated film,
   said water-based, chipping-resistant composition consisting essentially of, as major components
   (A) a modified ethylenical polymer which is obtained from ethylene monomer and an ethylenically unsaturated monomer containing a carboxyl group and which has been made water-dispersible by the addition of a base, and in which at least the backbone of the ethylenical polymer molecule has carboxyl groups bonded thereto and derived from the ethylenically unsaturated monomer, the total amount of the carboxyl groups being from 12.5 to 30% by weight based on the amount of the ethylenical polymer, and
   (B) a water-based polyurethane resin,
   the proportion of component (A) to component (B) being from 10/90 to 50/50 by weight, and wherein said chipping-resistant film has a dry thickness of 4 to 25/μm.

3. The coated article having a multi-layered film as claimed in claim 2, which comprises an automotive body having, formed thereon, an electrodeposited film, a film of chipping-resistant composition, an intermediate-coated film, and a topcoated film, said film of chipping-resistant composition disposed between the electrodeposited film and the intermediate-coated film being formed from a water-based, chipping-resistant composition consisting essentially of as major components, (A) a modified ethylene resin which is obtained from an ethylene monomer and an ethylenically unsaturated monomer containing a carboxyl group and which has been made water-dispersible by the addition of a base, and in which at least the backbone of the ethylenical polymer molecule has carboxyl groups bonded thereto and derived from the ethylenically unsaturated monomer, the total amount of the carboxyl groups being not less than 10% by weight based on the amount of the ethylenical polymer, and (B) a water-based polyurethane resin, the proportion of component (A) to component (B) being from 10/90 to 50/50 by weight.

4. The method as claimed in claim 1, wherein the total amount of carboxyl groups in said water-based, chipping-resistant composition is from 12.5 to 30% by weight based on the amount of ethylenical polymer.

5. The coated article as claimed in claim 2, wherein the total amount of carboxyl groups in said water-based, chipping-resistant composition is from 12.5 to 30% by weight based on the amount of ethylenical polymer.

6. The method as claimed in claim 1 wherein the proportion of component (A) to component (B) in said water-based, chipping-resistant composition is from 15/85 to 40/60 by weight.

7. The coated article as claimed in claim 2 wherein the proportion of component (A) to component (B) in said water-based, chipping-resistant composition is from 15/85 to 40/60 by weight.

8. The method as claimed in claim 1, wherein the proportion of component (A) to component (B) in said water-based, chipping-resistant composition is from 20/80 to 35/65 by weight.

9. The coated article as claimed in claim 2, wherein the proportion of component (A) to component (B) in said water-based, chipping-resistant composition is from 20/80 to 35/65 by weight.

10. The method as claimed in claim 1 wherein said water-based, chipping-resistant composition further comprises at least one resin selected from the group consisting of an epoxy resin, a phenolic resin, a melamine resin, a polyester resin, and an acrylic resin in an amount of from 1 to 20% by weight based on the amount of the composition.

11. The coated article as claimed in claim 2, wherein said water-based, chipping-resistant composition further comprises at least one resin selected from the group consisting of an epoxy resin, a phenolic resin, a melamine resin, a polyester resin, and an acrylic resin in an amount of from 1 to 20% by weight based on the amount of the composition.

12. The method as claimed in claim 1 wherein said chipping-resistant film is formed by applying said water-based chipping-resistant composition in (1) a coating process comprising electrodeposition, intermediate coating, and topcoating to form a film disposed between an electrodeposited film and an intermediate-coated film.

13. The method as claimed in claim 1 wherein said chipping-resistant film is formed by applying said water-based chipping-resistant composition in (1) a coating process comprising electrodeposition, intermediate coating, and topcoating to form a film disposed between an intermediate-coated film and a topcoated film.

14. The coated article as claimed in claim 2 wherein said chipping-resistant film is formed by applying said water-based chipping-resistant composition in (1) a coating process comprising electrodeposition, intermediate coating, and topcoating to form a film disposed between an electrodeposited film and an intermediate-coated film.

15. The coated article as claimed in claim 2 wherein said chipping-resistant film is formed by applying said water-based chipping-resistant composition in (1) a coating process comprising electrodeposition, intermediate coating, and topcoating to form a film disposed between an intermediate-coated film and a topcoated film.

16. The method as claimed in claim 1 wherein said chipping-resistant film is formed by applying said water-based chipping-resistant composition in (1) a coating process comprising electrodeposition, coating and topcoating to form a film disposed between an electrodeposited film and a topcoated film.

17. The coated article as claimed in claim 2 wherein said chipping-resistant film is formed by applying said water-based chipping-resistant composition in (1) a coating process comprising electrodeposition, coating and topcoating to form a film disposed between an electrodeposited film and a topcoated film.

18. The method as claimed in claim 1, wherein the modified ethylenical polymer is obtained from ethylene monomer and acrylic acid.

19. The coated article as claimed in claim 2, wherein the modified ethylenical polymer is obtained from ethylene monomer and acrylic acid.

20. The method as claimed in claim 1, wherein the modified ethylenical polymer is obtained by continuously introducing ethylene monomer and said ethylenically unsaturated monomer having a carboxyl group into a reaction vessel that is maintained at a pressure of 1,500 to 2,000 atmospheres and at a temperature of 150° to 250° C., in a proportion of about from 10,000:1 to 100:2 ethylene monomer to ethylenically unsaturated monomer, and in the presence of peroxide.

21. The coated article as claimed in claim 2, wherein the modified ethylenical polymer is obtained by continuously introducing ethylene monomer and said ethylenically unsaturated monomer having a carboxyl group into a reaction vessel that is maintained at a pressure of 1,500 to 2,000 atmospheres and at a temperature of 150° to 250° C., in a proportion of about from 10,000:1 to 100:2 ethylene monomer to ethylenically unsaturated monomer, and in the presence of peroxide.

* * * * *